US007359343B2

(12) United States Patent
Goodings

(10) Patent No.: US 7,359,343 B2
(45) Date of Patent: Apr. 15, 2008

(54) SYSTEM AND METHOD FOR REDUNDANT DATA TRANSMISSION IN A TIME DIVISION DUPLEX DATA FRAME

(75) Inventor: Chris J. Goodings, Fleet (GB)

(73) Assignee: VTech Telecommunications Limited, Tai Po, New Territory (HK)

( * ) Notice: Subject to any disclaimer, the term of this patent is extended or adjusted under 35 U.S.C. 154(b) by 823 days.

(21) Appl. No.: 10/035,073

(22) Filed: Dec. 28, 2001

(65) Prior Publication Data

US 2002/0172162 A1 Nov. 21, 2002

(30) Foreign Application Priority Data

Dec. 29, 2000 (GB) ................................. 0031812.1
Dec. 29, 2000 (GB) ................................. 0031817.0

(51) Int. Cl.
*G08C 17/00* (2006.01)
*H04L 1/02* (2006.01)

(52) U.S. Cl. ..................... 370/311; 375/347; 714/751

(58) Field of Classification Search ................ 370/276, 370/294, 280, 498, 522, 527–529, 277, 281, 370/295, 343, 311, 330, 337, 347; 714/751–752; 398/41–42, 79; 375/132, 135–136, 347
See application file for complete search history.

(56) References Cited

U.S. PATENT DOCUMENTS

| 5,371,734 | A | * | 12/1994 | Fischer ....................... 370/311 |
| 5,406,613 | A | * | 4/1995 | Peponides et al. .......... 455/574 |
| 5,528,621 | A | | 6/1996 | Heiman et al. |
| 5,640,415 | A | | 6/1997 | Pandula |
| 5,642,365 | A | * | 6/1997 | Murakami et al. .......... 714/761 |
| 5,694,438 | A | * | 12/1997 | Wang et al. ................. 375/347 |
| 6,967,943 | B1 | * | 11/2005 | Hamalainen et al. ....... 370/347 |
| 2006/0120333 | A1 | * | 6/2006 | Horvat et al. ............... 370/337 |

FOREIGN PATENT DOCUMENTS

| DE | 4407544 | 9/1995 |
| EP | 97 579 | 1/1984 |
| GB | 2239768 | 7/1991 |

(Continued)

OTHER PUBLICATIONS

UK Search Report dated Mar. 25, 2003.

(Continued)

*Primary Examiner*—Doris H. To
*Assistant Examiner*—Kerri M Rose
(74) *Attorney, Agent, or Firm*—Paul Hastings Janofsky & Walker, LLP

(57) ABSTRACT

A time division duplex digital radio frame structure with time and frequency diversity and method for use thereof is presented. Each packet of data is transmitted twice in successive frequency hops, such that the redundant transmission differs in both time and frequency from the primary transmission. A communications system employing the frame structure may be configured to dynamically shift between fully diverse, asynchronous and non-diverse modes of operation. The mode of operation may be selected based upon one or more operating parameters, such as battery power or detected interference. When error correction is implemented and a primary transmission is received without error, system devices may de-power circuitry to reduce power consumption.

13 Claims, 5 Drawing Sheets

FOREIGN PATENT DOCUMENTS

| | | |
|---|---|---|
| JP | 6-177863 | 6/1994 |
| JP | 6177863 | 6/1994 |
| WO | WO 95/34960 | 12/1995 |
| WO | WO 97/18639 | 5/1997 |
| WO | WO 98/53559 | 11/1998 |
| WO | WO 00/70811 | 11/2000 |
| WO | WO 00/74256 | 12/2000 |

OTHER PUBLICATIONS

German Office Action, Mar. 19, 2004.

\* cited by examiner

Figure 1: PRIOR ART

SYSTEM AND METHOD FOR REDUNDANT DATA TRANSMISSION IN A TIME DIVISION DUPLEX DATA FRAME

BACKGROUND OF THE INVENTION

1. Field of the Invention

This invention relates in general to wireless digital communications. In particular, the invention relates to a data frame structure for use in a wireless communications system, such as a single or multiple-handset cordless telephone system.

2. Background Art

Wireless telephone devices have become increasingly popular among individuals, finding use in many applications across both commercial and private sectors. The designers of modern telephone systems have embraced the use of digital technology to provide additional features, improved performance and increased reliability for the subscribers of the various systems. Whether it is a single-handset cordless phone used in the home, an enterprise-wide multiple-handset cordless phone system for a large corporation or one of the ubiquitous cellular phones, the vast majority of these systems have transitioned to, or are in the process of transitioning to, one of the numerous recognized digital communication standards.

Digital telephone manufacturers have a wide variety of digital technologies from which to choose when designing digital phone systems with each technology offering its own advantages. One such digital communication standard is Time Division Multiple Access, or TDMA. TDMA allows multiple users to communicate on the same radio frequency by transmitting bursts of encoded data at distinct, predetermined moments in time, referred to as timeslots. TDMA technology is frequently used in implementing cellular and both single- and multiple-handset cordless telephone systems, as well as other communication systems. A related technology is Time Division-Duplex (TDD). TDD systems carry both transmit and receive data on the same frequency channel, with the two communicating units taking turns alternately transmitting and receiving bursts of encoded data at successive moments in time. This is shown graphically in the single-channel cordless telephone TDD frame structure of FIG. 1. A single-handset cordless phone system is illustrated wherein the base station (BS) first transmits to the handset (HS) 100, which is then followed by the handset reply 101. The Received Signal Strength Indicator (RSSI) period 102 at the end of the frame is used to measure the level of interference on any particular frequency for interference mitigation, and is optional. The shaded areas indicate guard bands 103a, 103b and 103c to allow for frequency and switching settling during which no data transmission occurs. Communication systems that use TDMA and TDD technologies benefit from improved performance as compared to the performance of older analog communication systems.

Designers continually work to improve the quality and capacity of digital communication systems, including TDMA and TDD systems. One way in which system performance can be improved is through the use of frequency hopping. A frequency hopping radio system is one that transmits data (which in the context of cordless phones includes voice traffic) over a sequence of different carrier frequencies. At any one time, only one frequency is used but this frequency changes (hops) in the time domain. The sequence of frequencies used is known as the hop pattern.

Interference is always a concern in any communication system, and a frequency hopping communication system is no exception. Interference might take the form of a non-time-varying interfering signal, such as a fixed-frequency transmitter operating within the same frequency range as the hopping system, or a time-varying interference signal, such as another hopping system operating within the same band as the first hopping system.

One way in which the effects of fixed-frequency or slowly time-varying interference can be mitigated is through the use of frequency adaptation techniques. Once a system senses the presence of a steady interfering signal, the hopping frequencies that coincide with the interfering signal can be avoided. However, interference that varies in time at a rate similar to or faster than the hop speed of the link in question typically cannot be avoided by such frequency adaptation techniques because the frequency of the interfering signal cannot be predicted.

Another possible technique to combat interference and provide for more robust signal reception is the use of spatial diversity. Spatial diversity is created within a communications system when multiple physical paths are used to transmit the same information to its destination. This can be accomplished by using two separate antennas connected to two individual receivers that process the received signal. Because the signals inevitably take different paths to arrive at the physically separate receive antennas, the signals will be attenuated to different degrees by interference, fading or other phenomenon. The system can then select the stronger of the two received signals or combine the two signals in some fashion to provide the best possible received signal.

However, the implementation of such spatial diversity systems often increases the cost, increases physical size and power consumption requirements, and may not be appropriate for consumer products such as cordless telephones. More importantly, typical spatial diversity systems may not adequately address the interference challenges presented by other frequency hopping systems operating within the same frequency range.

Other common interference avoidance techniques rely upon the careful selection of filters such as ceramic, SAW, and cavity filters which are effective against known sources of interference that exist outside the operating bandwidth of the communication system, but typically cannot address interference signals operating in-band. Furthermore, complex interference cancellation algorithms have been employed in some systems to address in-band interference, but the efficacy of these techniques is often doubtful while the processing power required to implement them may be significant, with high development costs, making such algorithms undesirable for many consumer communication systems.

Thus, there exists a need to provide a low-cost, easy-to-implement solution that is effective against time varying interference for consumer communication systems such as cordless telephone systems and other systems that use TDMA TDD technology.

SUMMARY OF THE INVENTION

A time division duplex data frame is presented. The data frame can be used within a wireless frequency hopping communications system for reliably conveying data between devices utilizing time and frequency diversity. Each frame includes a primary data transmission period, as well as a redundant data transmission period. The redundant transmission period can be used for transmitting the same data content as was transmitted within the primary data transmission period of the preceding data frame. Thus, the redundant transmission is diverse in both time and frequency as compared to the primary data period. The data frame may also include a preamble, during which error detection and/or correction information can be conveyed to evaluate whether errors are introduced by the communications link.

Because the transmission of data during the redundant data period increases the power consumption and bandwidth utilized by a transmitting device, use of the redundant data period may depend upon various considerations. For example, where the transmitting device is battery powered, data may only be transmitted during the redundant data period when the level of power remaining in the device battery exceeds a predetermined threshold. Also, data may only be transmitted during the redundant data period when the quality of the communications link falls below a minimum acceptable level, such as when the bit error rate exceeds a predetermined threshold.

The power consumption required by the reception of the data frame can be reduced by determining whether the contents of the primary data period of a given frame are received without error. If so, then the receiver can be depowered during reception of the redundant data period of the next data frame.

DETAILED DESCRIPTION OF THE DRAWINGS

Figure 1:
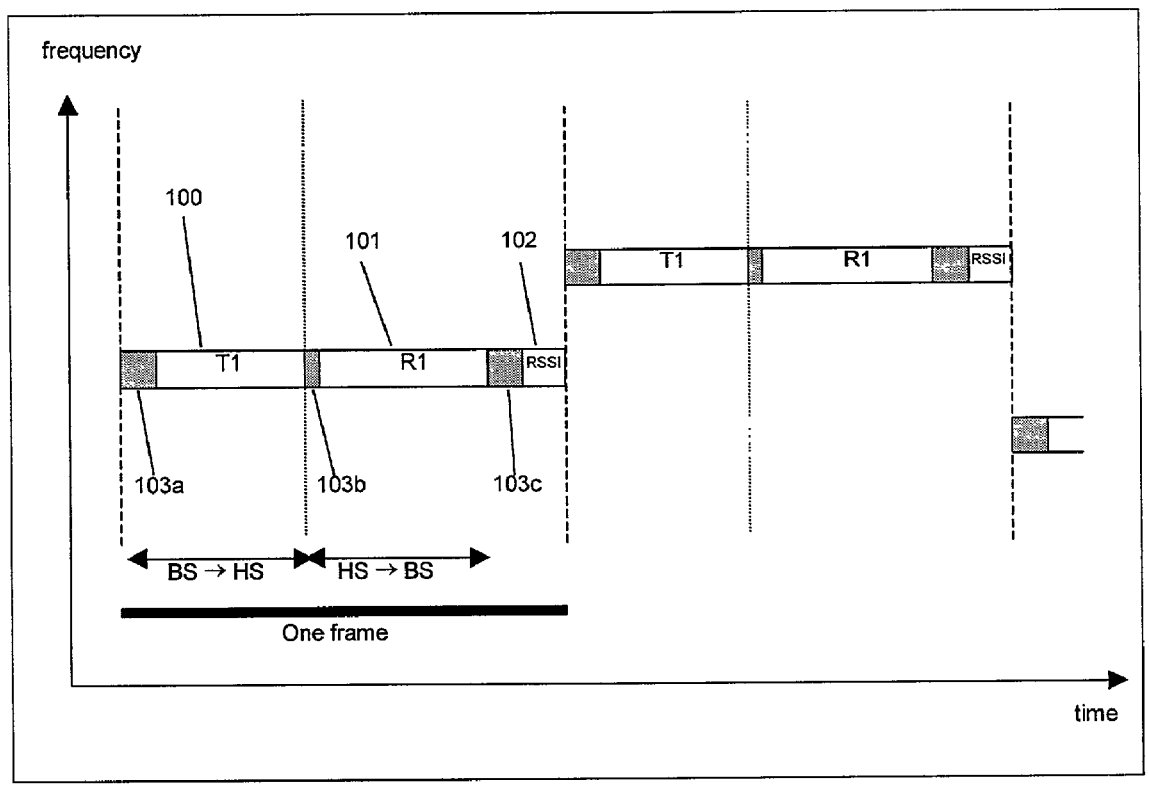
FIG. 1 is a plot of a prior art single-channel TDD hopping frame structure in a frequency hopping communication system.

While this invention is susceptible to embodiment in many different forms, there are shown in the drawings and will be described in detail herein several specific embodiments, with the understanding that the present disclosure is to be considered as an exemplification of the principle of the invention and is not intended to limit the invention to the embodiment illustrated.

Figure 2:
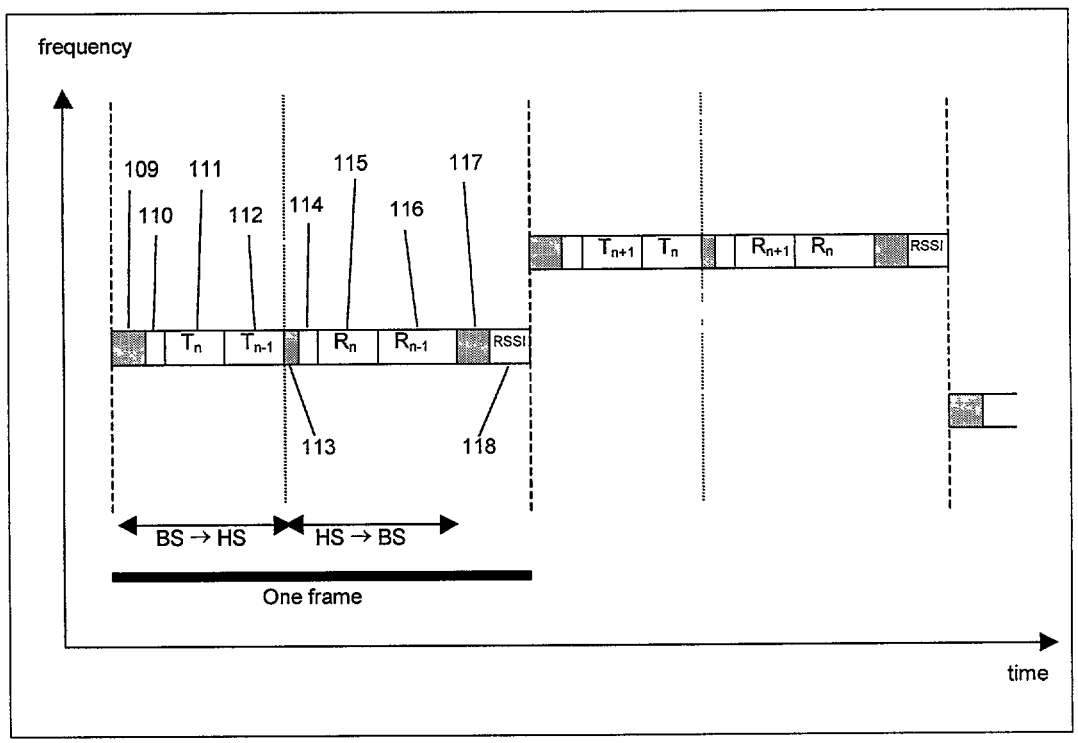
FIG. 2 is a plot depicting a first TDD frame structure with time and frequency diversity.

FIG. 2 illustrates a time division-duplex (TDD) frame structure that transmits each packet of data twice in successive frequency hops so that there is both frequency and time diversity in the data transmission. Thus, if data is corrupted by an interference source during a first, primary transmission, then a second, redundant transmission of that same data may increase the likelihood that the data will be received without corruption.

The frame structure begins with guard band 109, which provides time for settling of the transmitter carrier frequency. Transmit preamble 110 contains data which is not subject to time/frequency diversity, such as a synchronisation field. Primary transmit data period 111 contains data content which is new to the current frame, i.e., which is transmitted for the first time. Redundant data period 112 contains data that was transmitted during a prior frame. The data transmitted during periods 111 and 112 implements an error detection protocol, such as through the inclusion of a CRC field. Guard band 113 allows a transceiver implementing the frame structure of FIG. 2 to switch between transmit and receive modes of operations, such as for settling of a transmit/receive (T/R) switch or a phase-locked loop (PLL). Moreover, the guard bands further provide timing margin to accommodate the effects of propagation delay in the communications system. Receive preamble 114 allows for the receipt of a data field analogous to that which is transmitted during transmit preamble 110. During primary receive data period 115, the first transmission of a data block is received. During redundant data period 116, the second transmission of a data block, which was previously received during the prior frame, is received a second time. Guard band 117 provides time for PLL settling, as may be necessary for retuning of the receiver circuit. Finally, RSSI field 118 provides a period during which a different carrier frequency can be observed by the transceiver, such as may be desirable to determine the level of interference or other communications occurring on a particular frequency channel. This frame structure is then periodically repeated on each frequency in the frequency hop sequence.

By transmitting data packets on different frequencies and at different times, transient interference, such as that arising from many frequency-hopping communications applications, is more likely to be avoided. When interference is present at the time and frequency at which a primary data transmission occurs, that interference source is not likely to be present at the different time and different frequency at which the redundant data transmission occurs in the subsequent frame.

Figure 3:
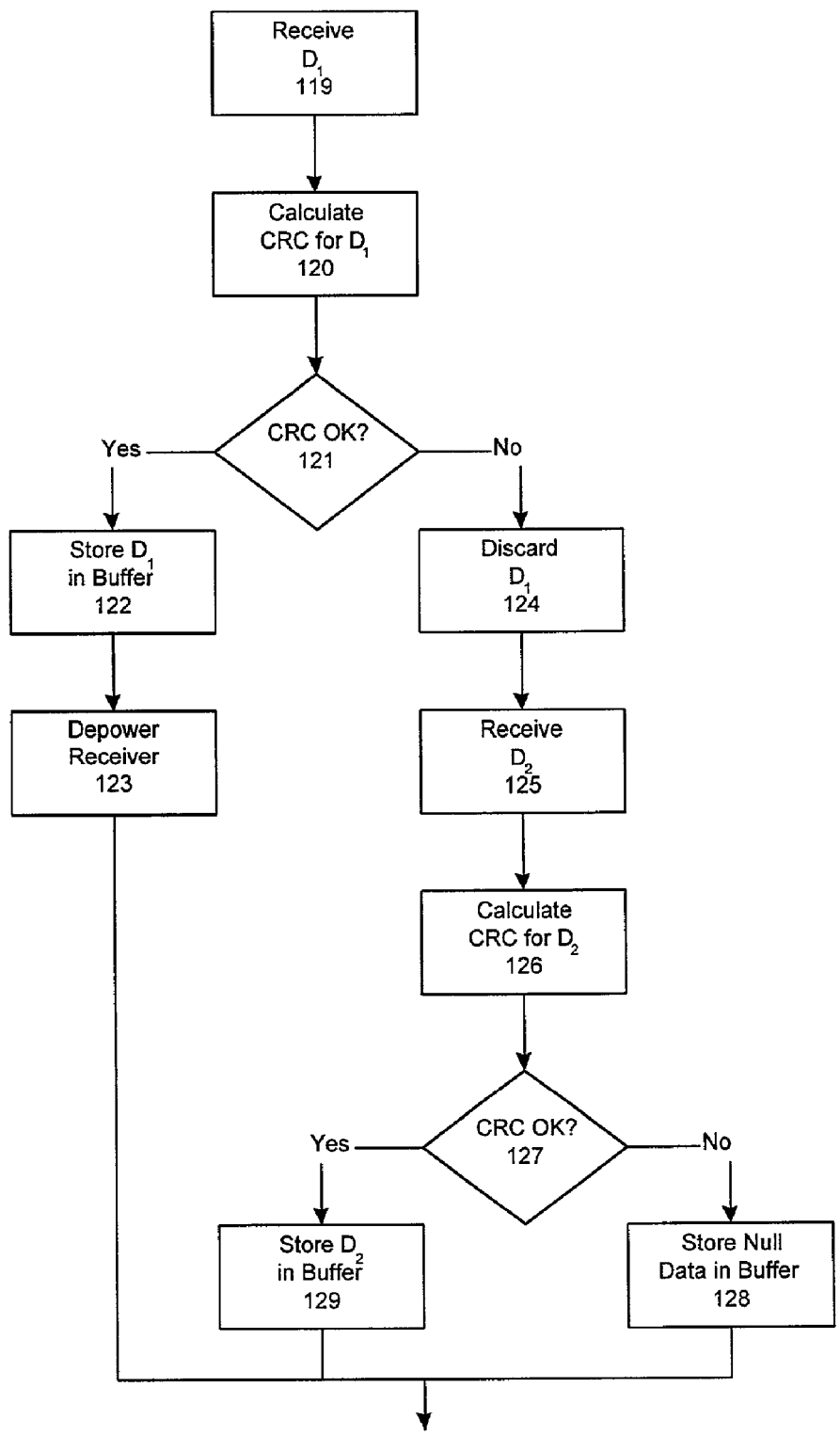
FIG. 3 is a flow chart depicting a data handling routine for a frame structure with time and frequency diversity.

FIG. 3 illustrates a data handling technique implemented by the receiver portion of a transceiver operating using the frame structure of FIG. 2. The contents of a data packet that is received for the first time in a first frame (e.g. during the primary data receive period 115) is referred to as $D_1$ in FIG. 3, while data being received for the second time in the subsequent frame (e.g. during the redundant data receive period 116) is referred to as $D_2$ in FIG. 3. $D_1$ is received, step 119. An error detection and correction protocol, such as a cyclical redundancy check ("CRC"), is calculated based upon $D_1$, step 120. The CRC calculated in step 120 is compared to the error detection field received within $D_1$ during the first frame to determine whether the contents of $D_1$ were corrupted during transmission, step 121. If $D_1$ was received correctly, then the second data transmission $D_2$ during the subsequent data frame is not required, so any data received during this second period in the subsequent frame can be ignored. Thus, data $D_1$ is stored in a buffer (or memory) for later use, step 122.

In the embodiment of FIG. 3, when $D_1$ is received correctly, the transceiver's receive circuitry is de-powered during the redundant receive period of the subsequent frame, step 123, such that power is conserved during the period during which $D_2$ would otherwise be received. This operation can often provide substantial power savings since under normal conditions the data will be received correctly on the first occasion. While a data frame analogous to that of FIG. 2 can be implemented with the order of the primary and redundant receive periods switched in other embodiments, implementation of this power conservation technique may require that the primary data period be received before the redundant data period. Otherwise, for example, lag times involved in depowering and repowering the receiver between the receive preamble and the primary receive data period—both of which should always be received—would diminish the period of time during which the receiver could remain depowered.

If, however, at step 121 the CRC indicates that $D_1$ is corrupted, then redundant transmission is required. $D_1$ is discarded, step 124, and the redundant transmission of the same data during the subsequent data frame, $D_2$, is received, step 125. Upon reception, $D_2$ is checked for errors via calculation of the CRC, step 126, and the CRC is evaluated, step 127. If $D_2$ is received without corruption, then $D_2$ is stored in the buffer for subsequent processing, step 129. However, if the redundant transmission of the data $D_2$ is also corrupted, null data is stored in the buffer, step 128. The process of FIG. 3 is subsequently repeated for each data frame. Meanwhile, data stored in the buffer can be retrieved as required for further processing as appropriate.

While in the above-described embodiment the redundant transmission of the previous frame's data occurs after the transmission of the new data to achieve power savings through strategic deactivation of the receiver circuitry, in other embodiments it may be desirable to reverse the order of data transmission. Specifically, buffer memory and computational requirements can be reduced by retransmitting the prior frame's data before transmitting new data. This allows the receiver to, for example, choose between the primary and redundant transmissions of any given data block, and subsequently pass that data on for processing, before any subsequent new data is received and stored. Thus, by reversing the order of data transmission from that shown in the drawings, the receiver need not handle both new and old subpackets of data simultaneously.

Figure 4:
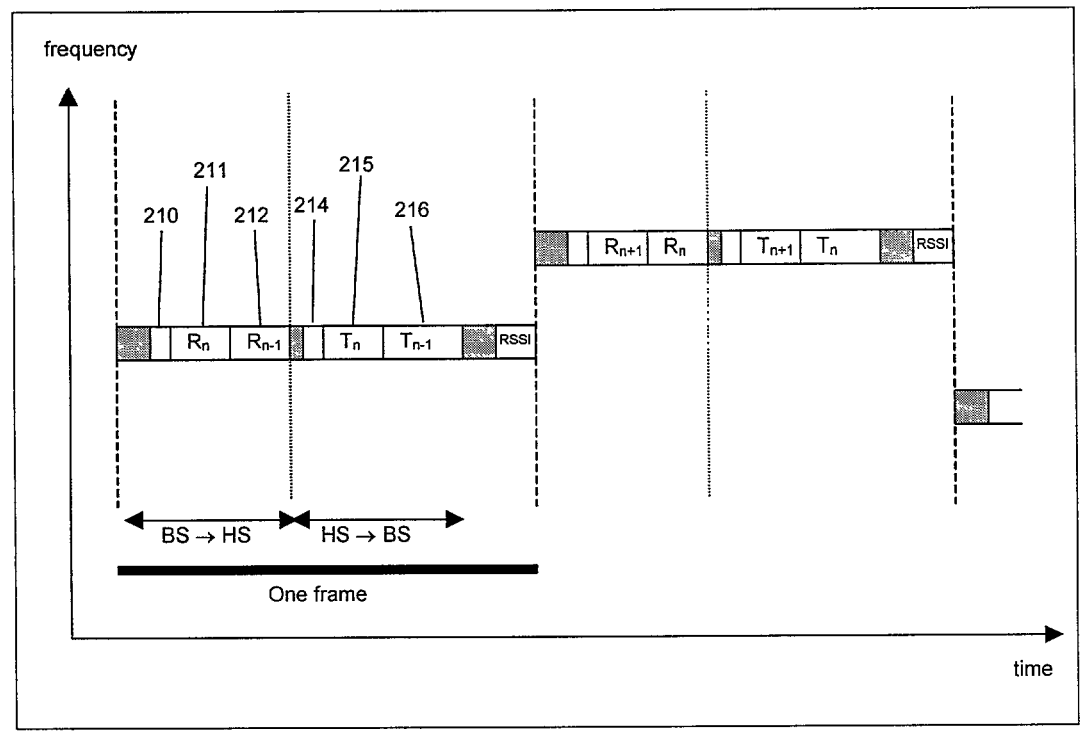
FIG. 4 is a plot depicting a second TDD frame structure with time and frequency diversity.

While FIG. 2 illustrates a frame structure in the context of a cordless telephone base unit in a single-handset system, it is understood that the frame structure can be used by the associated cordless telephone handset by reversing the positions of the transmit periods 110, 111 and 112 with receive periods 114, 115 and 116, respectively. Such a system is depicted in FIG. 4, where receive periods 210, 211 and 212 are analogous to receive periods 114, 115 and 116 in FIG. 2. Similarly, in FIG. 4 transmit periods 214, 215 and 216 are analogous to transmit periods 110, 111 and 112 in FIG. 2. Furthermore, the timing of the base and handset data frames are configured such that when the base unit transmits data during the primary and redundant transmit periods, the handset receives the transmitted data during the associated handset primary and redundant receive periods, respectively. Similarly, when the handset transmits data during the primary and redundant transmit periods, the base unit receives the transmitted data during the associated base unit primary and redundant receive periods, respectively.

The invention can be readily employed in the context of a multiple-handset, time division multiple access cordless telephone system by including a plurality of receive slots comprised of preamble, primary and redundant periods and a plurality of transmit slots comprised of preamble, primary and redundant periods. Also, a system implementing the frame structures of FIGS. 2 and 4 can support a second handset communicating during the redundant slot when the diversity feature is not used. The frame structure can be readily utilised in wireless digital communications applications other than cordless telephones.

Figure 5:
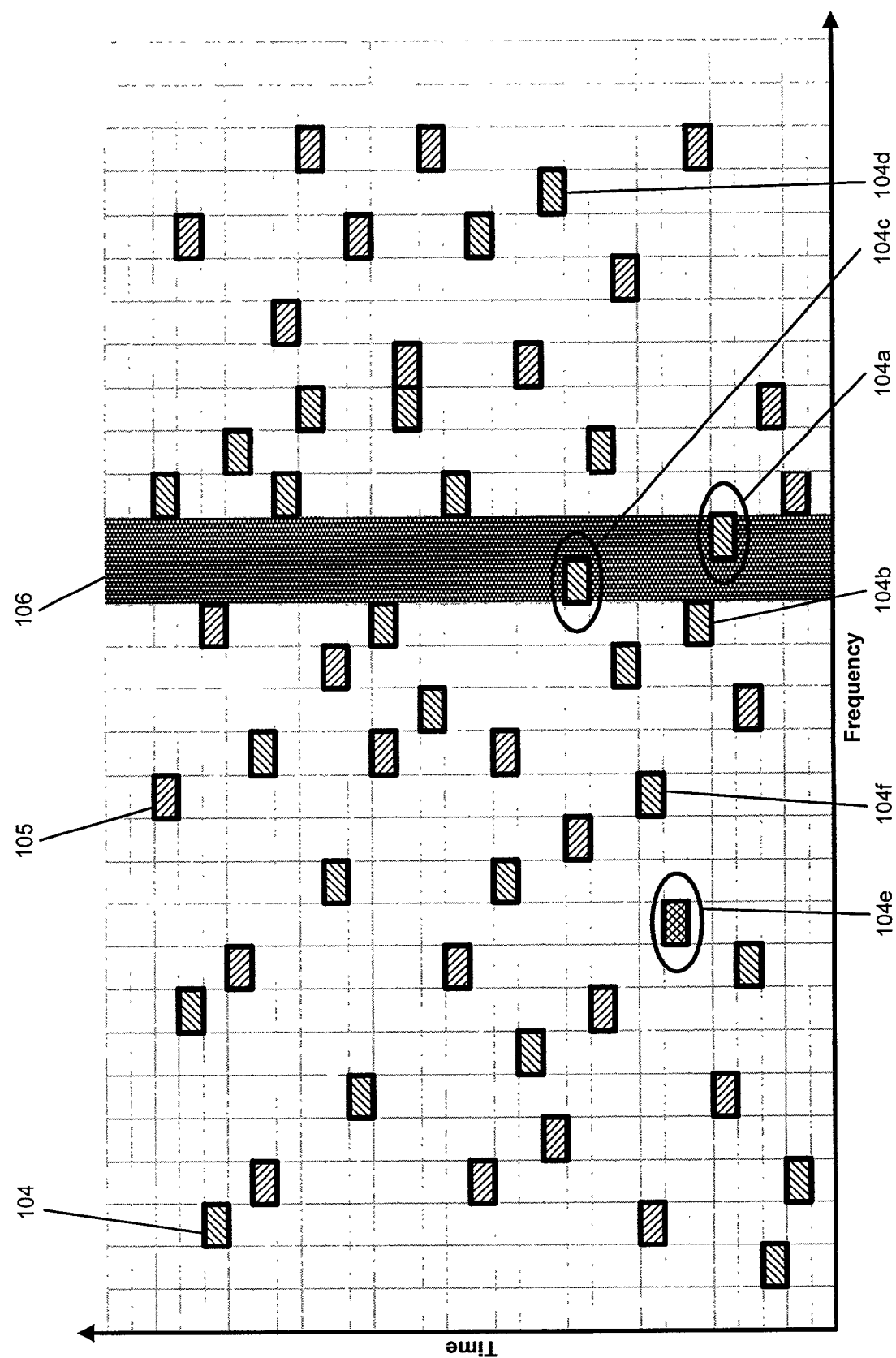
FIG. 5 is a plot depicting frequency hops over time for a hopping system with hopping and fixed-frequency sources of interference.

FIG. 5 illustrates the operation of the frame structure of FIG. 2 in the context of a frequency hopping system with both fixed-frequency and hopping interference sources. Transmissions generated by three overlapping communications systems (two frequency-hopping systems and one fixed-frequency system) are plotted as a function of time versus frequency. Transmissions of the fixed-frequency system are depicted as shaded region 106. Transmissions of first frequency hopping system 104 are illustrated by frequency hops with hatching sloping downward to the left. Transmissions of second frequency hopping system 105 are illustrated by frequency hops with hatching sloping downward to the right.

Communication systems 105 and 106 both generate undesired interference with respect to communications system 104. Each time the frequency of system 104 clashes with an interfering signal (either the hopping signal 105 or the fixed-frequency signal 106), data may be lost with a resulting degradation of voice quality or data throughput. For example, frequency hops 104*a* and 104*c* occur at the same time and frequency as transmissions of fixed-frequency communications system 106. Hop 104*e* suffers from interference with second hopping system 105 and is thus shown as including both hatching sloping downwards to the left and hatching sloping downwards to the right. Thus, the use of frame structures for system 104 other than the present frame structure could likely result in degraded communications due to interference during hops 104*a*, 104*c* and 104*e*.

However, via implementation of the diversity frame structure of FIG. 2, data corrupted by the interference sources of FIG. 5 is re-transmitted in the subsequent hop where the data is likely to be received without interference. For example, data transmitted during corrupted hop 104*a* is retransmitted during hop 104*b*, which can be correctly conveyed without interference. Similarly, data transmitted during corrupted hop 104*c* can be properly received during hop 104*d*. Data transmitted during corrupted hop 104*e* can be properly received during hop 104*f*.

A communication system that employs the frame structure of FIG. 2 can be configured to operate in a multitude of modes, including a diverse mode, a non-diverse mode and an asynchronous mode by choosing whether or not to receive and/or transmit the redundant data in a subsequent frame. In a fully diverse mode of operation, both communication units would transmit and receive data periods 112 and 116, respectively, as described above. In a non-diverse mode, neither unit would transmit or receive the redundant data periods 112 and 116. In an asynchronous mode, one communication unit operates in a first diversity mode, with either a communications uplink or a communications downlink operating in a diverse mode, while the other link implements a non-diverse mode of operation, such that improved communications reliability is achieved for only one direction of a bi-directional link.

Figure 6:
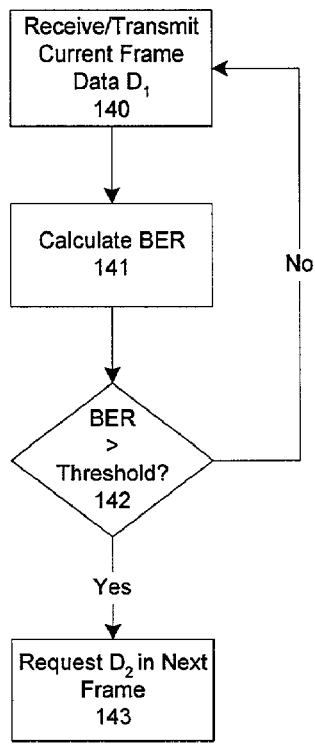
FIG. 6 is a flow chart depicting a method to implement a time/frequency diversity frame structure upon the satisfaction of an operating condition.

FIG. 6 illustrates a technique for controlling the diversity mode of operation for a wireless communications device operating according to the frame structure of FIG. 2, whereby the mode of operation is dependent upon an operating condition. Specifically, the technique of FIG. 6 forces a device into a diversity mode of operation when necessary to maintain adequate quality of the communications link. Data is received by a device, step 140, in a non-diverse mode of operation, and the bit error rate ("BER") of received data is calculated, step 141. The BER is then compared to a predetermined threshold associated with the minimum desirable performance level, step 142. If the BER exceeds the threshold, such that the non-diverse mode of operation is unable to achieve the desired communications link quality, then the device transitions the communications link into a diverse mode of operation, such that subsequent data transmissions are received with time and frequency diversity. For example, in step 143, the device may transmit a command in the next frame requesting that the counterpart transmitter transition into a diverse transmission mode. If the BER is below the threshold, step 142, then the device continues operating in a non-diverse mode. Thus, when interference does not substantially degrade system performance, then bandwidth and power can be conserved by operating in a non-diverse mode and avoiding redundant transmission and reception of data packets. However, when interference is present, the system can readily transition to a diverse communications link to maintain high levels of system performance. While FIG. 6 uses BER to control the diversity mode, other system parameters can also be used to determine the diversity mode. Thus, when interference does not substantially degrade system performance, then bandwidth and power can be conserved by operating in a non-diverse mode and avoiding redundant transmission and reception of data packets. However, when interference is present, the system can readily transition to a diverse communications link to maintain high levels of system performance. While FIG. 6 uses BER to control the diversity mode, other system parameters can also be used to determine the diversity mode.

Figure 7:
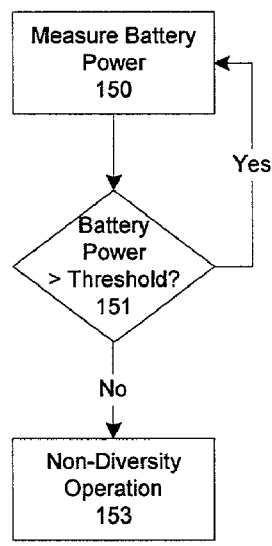
FIG. 7 is a flow chart depicting a method to implement a time/frequency diversity frame structure based upon power reserves available in a battery-operated transceiver unit.

Because transmission and reception of redundant data packets can consume a substantial amount of power, it may also be desirable to base the selection of operation mode upon the power level remaining in a battery powered communications device. FIG. 7 illustrates a method by which a battery-powered communications device can be forced to a non-diversity mode of operation based upon the power level remaining in the battery. The remaining battery power is determined, step 150. The battery power level is then measured to determine whether the remaining power level exceeds a predetermined threshold, step 151. If so, the operation repeats without effecting the mode of operation. If not, then the device is transitioned into a non-diverse mode of operation, step 153, thereby conserving battery power and extending the life of the communications device. Because a transceiver's transmitter typically consumes substantially more power than a receiver circuit, it may be desirable to only switch the transmitter mode of operation to non-diverse in step 153, such that a portable device can still benefit from redundant transmissions received from a more highly powered counterpart device. It is further understood that many variations of diversity operating modes between two or more communication units are possible without departing from the invention.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

I claim:

1. A wireless frequency hopping digital communications system, where communications in successive data frames occur on different wireless carrier frequencies, comprising:
   a transmitter configured for transmitting:
      a first block of digital data during a primary data transmission period of a data frame where the first block of digital data has not been previously transmitted; and
      a second block of digital data during a redundant data transmission period of the data frame, where the second block of digital data was previously transmitted at a different carrier frequency during a primary data transmission period of a prior data frame; and
   a receiver configured for receiving:
      a third block of digital data during a primary data receive period of the data frame, where the third block of digital data has not previously been received; and
      a fourth block of digital data during a redundant data receive period of the data frame, where the fourth block of digital data was previously received at a different carrier frequency during the primary data receive period of the prior data frame,
   wherein the transmitter is further configured to transmit the second block of data only if the battery power level of a battery-powered wireless communications device utilizing the data frame exceeds a predetermined level, and
   wherein the receiver is further configured during every data frame to receive in the primary data receive period a block of digital data not previously received and configured to receive in the redundant data receive period a block of digital data received in the primary data receive period of a prior data frame even if the battery power level of a battery-powered wireless communications device utilizing the data frame does not exceed the predetermined level.

2. The system of claim 1, wherein
   the transmitter transmits error detection information associated with the contents of the primary data transmit period and the redundant data transmit period-during a transmit preamble period of the data frame;
   the receiver receives error detection information associated with the contents of the primary data receive period and the redundant data receive period during a receive preamble period of the data frame.

3. The system of claim 1, in which the transmitter transmits the second block of data only if the quality of communications within the wireless frequency hopping communications system fails to satisfy a predetermined quality threshold.

4. The system of claim 3, in which the predetermined quality threshold is a maximum bit error rate.

5. The system of claim 1, in which the receiver receives the fourth block of data only if the quality of communications within the wireless frequency hopping communications system fails to satisfy a predetermined quality threshold.

6. The system of claim 5, in which the predetermined quality threshold is a maximum bit error rate.

7. A wireless frequency hopping digital communications system, where communications in successive data frames occur on different wireless carrier frequencies, comprising a portable device that comprises:
   a receiver configured during every data frame to receive a first block of digital data during a primary data receive period, where the first block of digital data has not been previously received; and configured during every data frame to receive a second block of digital data during a redundant data receive period, where the second block of digital data was previously received at a different carrier frequency during the primary data transmission period of the prior data frame; and
   a transmitter configured to transmit a third block of digital data during a primary data transmit period, where the third block of digital data has not been previously transmitted; and configured to transmit, only if a battery power of the portable device exceeds a predetermined threshold, a fourth block of digital data during a redundant data transmit period, where the second block of digital data was previously transmitted.

8. A method for communicating data between a first device and a second device via a wireless frequency hopping digital communications link, which method is comprised of the steps of:

transmitting a first block of data from the first device to the second device during a primary data transmission period of a first data frame, where the first block of data has not been previously transmitted;

transmitting a second block of data from the first device to the second device during a second data transmission period of the first data frame, where the second block of data was also transmitted by the first device during a data frame immediately preceding the first data frame;

transmitting a third block of data from the second device to the first device during a third data transmission period of the first data frame, where the third block of data has not been previously transmitted; and transmitting, only if a battery level of the second device exceeds a predetermined threshold, a fourth block of data from the second device to the first device during a fourth data transmission period of the first data frame, where the fourth block of data was also transmitted by the second device during the data frame period immediately preceding the first data frame, wherein, even if the battery level of the second device does not exceed the predetermined threshold, the second device is further configured during every data frame to receive in the primary data receive period a block of digital data not previously received and configured to receive in the redundant data receive period a block of digital data received in the primary data receive period of an immediately prior data frame.

9. A method for communication data between a first device and a second device via a wireless frequency hopping digital communications link where the communications are divided into a plurality of data frames, which method is comprised of the steps of:

transmitting at least one data block within each frame from the first device to the second device, where each data block is transmitted one time;

determining that the quality of the communications link fails to satisfy a predetermined criterion;

transmitting a first data block and a second data block from the first device to the second device within each frame, the first data block containing data that has not been previously transmitted from the first device to the second device, the second data block containing data that was also transmitted from the first device to the second device during the preceding frame;

transmitting a third data block from the second device to the first device within each frame, the third data block containing data that has not been previously transmitted from the second device to the first device; and transmitting, only if a battery power of the second device exceeds a predetermined threshold, a fourth data block from the second device to the first device within each frame, containing data that was also transmitted from the first device to the second device during the preceding frame, wherein, even if the battery level of the second device does not exceed the predetermined threshold, the second device is configured to receive the first data block and the second block within each frame.

10. The method of claim 9, in which the step of determining that the quality of the communications link fails to satisfy a predetermined criterion is further comprised of the substeps of:

measuring a bit error rate of data transmitted on the communications link;

determining that the bit error rate exceeds a predetermined maximum acceptable level.

11. A method for communication data between a first device and a second device via a wireless frequency hopping digital communications link where the communications are divided into a plurality of data frames and the first device is powered by a battery power source, which method is comprised of the steps of:

transmitting a first data block and a second data block from the first device to the second device within each frame, the first data block transmitted in a primary data period and containing data that has not been previously transmitted from the first device to the second device, the second data block transmitted in a redundant data period and containing data that was also transmitted from the first device to the second device during the preceding frame;

receiving a third data block from the second device at the first device within each frame, the third data block containing data that has not been previously received from the second device by the first device;

determining that the level of power remaining in the battery power source is below a predetermined threshold level;

transmitting at least one data block within each frame from the first device to the second device, where each data block is transmitted only one time when the battery power source of the first device is below the predetermined threshold; and receiving, even when the battery power source of the first device is below the predetermined threshold, a fourth data block from the second device by the first device within each frame, the fourth data block containing data that was also transmitted from the second device to the first device during the preceding frame.

12. A method for receiving and sending data via a wireless frequency hopping digital communications link in which one data frame is transmitted during each frequency hop, the data frame including a primary period for receiving an initial copy of a data block and a secondary period for receiving a redundant copy of the data block, the method comprising the steps of:

receiving at a first device a first data frame containing a first data block and an error detection field associated with the contents of the first data block during a first frequency hop;

using the contents of the error detection field to determine that the first data block was received with one or more errors;

receiving, even if a battery power source of the first device is below a predetermined threshold, a second data frame containing a second data block and an error detection field associated with the contents of the second data block during a second frequency hop immediately following the first frequency hop, where the contents of the second data block are identical to the contents of the first data block;

using the contents of the error detection field to determine whether the second data block was received with one or more errors;

storing null data into the buffer if the second data block was received with one or more errors;

storing the contents of the second data block into a buffer if the second data block was received without error;

transmitting a third block of data from the first device to a second device during the first data frame, where the third block of data has not been previously transmitted; and transmitting, only if the battery power source is above the predetermined threshold, a fourth block of data from the first device to the second device during the second data frame period, where the fourth block of data was also previously transmitted by the first device, wherein the first device is configured during every data frame to receive in the primary data receive period a block of digital data not previously received and configured to receive in the redundant data receive period a block of digital data received in the primary data receive period of a prior data frame even if the battery power level of a battery-powered wireless communications device utilizing the data frame does not exceed the predetermined level.

13. A method for receiving data by a wireless device via a frequency hopping digital communications link, the communications link being comprised of a plurality of successive data frames, each data frame comprising a primary data period and a redundant data period, where the contents of the redundant data period are the same as the contents of the primary data period during the preceding frame, the method comprising the steps of:

receiving a first data frame, the first data frame also containing an error detection field associated with the contents of at least the first data period of the first data frame;

using the contents of the error detection field to determine that the contents of the first data period were received without any errors; and maintaining power in the receiver circuit during receipt of the primary data period during a second data frame immediately following the first date frame, wherein, in each data frame, the wireless device is configured to:

transmit a first block of data from the wireless device to a second device during the each data frame, where the first block of data has not been previously transmitted;

transmit, only if a battery power of the wireless device exceeds a predetermined threshold, a second block of data from the wireless device to the second device during the each data frame, where the second block of data was also transmitted by the wireless device during a data frame immediately preceding the each data frame;

receive a third block of data from the second device during the each data frame, where the third block of data has not been previously transmitted; and receive, even if the battery power of the wireless device is below the predetermined threshold, a fourth block of data from the second device during the each data frame, where the fourth block of data was previously transmitted by the second device.

* * * * *